United States Patent
Zou et al.

(10) Patent No.: US 10,796,700 B2
(45) Date of Patent: Oct. 6, 2020

(54) ARTIFICIAL INTELLIGENCE-BASED CROSS-LANGUAGE SPEECH TRANSCRIPTION METHOD AND APPARATUS, DEVICE AND READABLE MEDIUM USING FBANK40 ACOUSTIC FEATURE FORMAT

(71) Applicant: BAIDU ONLINE NETWORK TECHNOLOGY (BEIJING) CO., LTD., Beijing (CN)

(72) Inventors: Wei Zou, Beijing (CN); Xiangang Li, Beijing (CN); Bin Huang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 149 days.

(21) Appl. No.: 15/978,465

(22) Filed: May 14, 2018

(65) Prior Publication Data
US 2018/0336900 A1 Nov. 22, 2018

(30) Foreign Application Priority Data
May 18, 2017 (CN) .......................... 2017 1 0351933

(51) Int. Cl.
*G06F 17/28* (2006.01)
*G10L 15/02* (2006.01)
(Continued)

(52) U.S. Cl.
CPC ............ *G10L 15/265* (2013.01); *G06F 40/42* (2020.01); *G06F 40/47* (2020.01); *G06F 40/51* (2020.01);
(Continued)

(58) Field of Classification Search
CPC . G06F 17/289; G10L 15/02; G11B 20/00007; G11B 20/10527; H04L 12/5692
(Continued)

(56) References Cited

U.S. PATENT DOCUMENTS

| 4,943,865 A * | 7/1990 | Hales ............... G11B 20/10527 360/32 |
| 7,643,985 B2 * | 1/2010 | Horvitz ................. G06F 17/289 704/2 |

(Continued)

FOREIGN PATENT DOCUMENTS

| CN | 1140870 A | 1/1997 |
| CN | 102084417 A | 6/2011 |

(Continued)

OTHER PUBLICATIONS

Chinese Office Action dated Oct. 9, 2019, for related Chinese Appln. No. 201710351933.9; 5 Pages.

(Continued)

*Primary Examiner* — Farzad Kazeminezhad
(74) *Attorney, Agent, or Firm* — Brooks Kushman PC (57) ABSTRACT

An artificial intelligence-based cross-language speech transcription method and apparatus, a device and a readable medium. The method includes pre-processing to-be-transcribed speech data to obtain multiple acoustic features, the to-be-transcribed speech data being represented in a first language; predicting a corresponding translation text after transcription of the speech data according to the multiple acoustic features and a pre-trained cross-language transcription model; wherein the translation text is represented in a second language which is different from the first language. According to the technical solution, it is unnecessary, upon cross-language speech transcription, to perform speech recognition first and then perform machine translation, but to directly perform cross-language transcription according to (Continued)

the pre-trained cross-language transcription model. The technical solution can overcome the problem of error accumulation in the two-step cross-language transcription manner in the prior art, and can effectively improve accuracy and efficiency of the cross-language speech transcription as compared with the prior art.

12 Claims, 4 Drawing Sheets

(51) Int. Cl.
G11B 20/00 (2006.01)
G11B 20/10 (2006.01)
H04L 12/54 (2013.01)
G10L 15/26 (2006.01)
G10L 15/22 (2006.01)
G06F 40/42 (2020.01)
G06F 40/47 (2020.01)
G06F 40/51 (2020.01)
G10L 15/06 (2013.01)

(52) U.S. Cl.
CPC .............. *G10L 15/22* (2013.01); *G10L 15/26* (2013.01); *G10L 15/02* (2013.01); *G10L 15/063* (2013.01)

(58) Field of Classification Search
USPC ....................................... 704/2, 236; 382/234
See application file for complete search history.

(56) References Cited

U.S. PATENT DOCUMENTS

| | | | |
|---|---|---|---|
| 9,710,464 B1* | 7/2017 | Undavalli | G06F 17/289 |
| 2006/0136596 A1* | 6/2006 | Izumi | H04L 12/5692 709/230 |
| 2008/0131009 A1* | 6/2008 | Tsuchida | G11B 20/00007 382/234 |
| 2012/0109626 A1 | 5/2012 | Yassa | |
| 2014/0303957 A1 | 10/2014 | Lee et al. | |
| 2016/0042734 A1* | 2/2016 | Cetinturk | G10L 15/02 704/236 |
| 2017/0060850 A1* | 3/2017 | Lewis | G06F 40/47 |
| 2018/0322333 A1* | 11/2018 | Lacewell | G06N 20/00 |

FOREIGN PATENT DOCUMENTS

| | | |
|---|---|---|
| CN | 102237083 A | 11/2011 |
| CN | 103020048 A | 4/2013 |
| CN | 105336323 A | 2/2016 |
| CN | 105786801 A | 7/2016 |
| EP | 0736857 A2 | 10/1996 |
| KR | 10-2011-0065916 A | 6/2011 |

OTHER PUBLICATIONS

Chinese Search Report dated Sep. 22, 2019 for related Chinese Appln. No. 201710351933.9; 3 Pages.

* cited by examiner

ARTIFICIAL INTELLIGENCE-BASED CROSS-LANGUAGE SPEECH TRANSCRIPTION METHOD AND APPARATUS, DEVICE AND READABLE MEDIUM USING FBANK40 ACOUSTIC FEATURE FORMAT

The present application claims the priority of Chinese Patent Application No. 2017103519339, filed on May 18, 2017, with the title of "Artificial intelligence-based cross-language speech transcription method and apparatus, device and readable medium". The disclosure of the above applications is incorporated herein by reference in its entirety.

FIELD OF THE DISCLOSURE

The present disclosure relates to the technical field of computer application, and particularly to an artificial intelligence-based cross-language speech transcription method and apparatus, a device and a readable medium.

BACKGROUND OF THE DISCLOSURE

Artificial intelligence AI is a new technical science for researching and developing theories, methods, technologies and application systems for simulating, extending and expanding human intelligence. Artificial intelligence is a branch of computer sciences and attempts to learn about the essence of intelligence, and produces a new intelligent machine capable of responding in a manner similar to human intelligence. The studies in the field comprise robots, language recognition, image recognition, natural language processing, expert systems and the like.

As speech technologies develop, speech transcription from speech to a corresponding text gradually prevails in daily life. However, the current speech transcription technique can only recognize and transcribe speech in the current language, for example, a corresponding transcription result of one mandarin speech is a text of Chinese characters corresponding to the speech. The current speech transcription technique cannot satisfy the demand of cross-language speech transcription, for example, it is impossible to directly translingually transcribe one input mandarin speech into a corresponding English translation text. To implement cross-language speech transcription, a two-step scheme is mostly employed in the prior art: first, using a speech recognition tool to transcribe the input speech and generate a text; then, translating the generated text via machine translation and finally obtaining a cross-language speech transcription text result.

However, when the cross-language speech transcription is performed in a conventional manner, if the speech recognition tool in the first step recognizes wrongly, a final speech transcription text obtained from machine translation inevitably goes wrong, i.e., the cross-language speech transcription in the prior art is inevitably confronted with accumulation of errors and causes an undesirable accuracy and a lower transcription efficiency.

SUMMARY OF THE DISCLOSURE

The present disclosure provides an artificial intelligence-based cross-language speech transcription method and apparatus, a device and a readable medium, to improve the accuracy and efficiency of the cross-language speech transcription.

The present disclosure provides an artificial intelligence-based cross-language speech transcription method, the method comprising:

pre-processing to-be-transcribed speech data to obtain multiple acoustic features, the to-be-transcribed speech data being represented in a first language;

predicting a corresponding translation text after transcription of the speech data according to the multiple acoustic features and a pre-trained cross-language transcription model; wherein the translation text is represented in a second language which is different from the first language.

Further optionally, in the method, the pre-processing to-be-transcribed speech data to obtain multiple acoustic features specifically comprises:

sampling the to-be-transcribed speech data at a preset sampling rate, to obtain multiple speech data sampling points;

performing quantization processing for the multiple speech data sampling points according to preset quantization bits, to obtain a Pulse Code Modulation file;

extracting the multiple acoustic features from the Pulse Code Modulation file.

Further preferably, in the method, the extracting the multiple acoustic features from the Pulse Code Modulation file specifically comprises:

selecting data frame of a present frame length from a beginning of the Pulse Code Modulation file; adjusting a preset frame shift in turn from front to back and then selecting data frames of the preset frame length to obtain multiple data frames;

extracting an acoustic feature of each data frame from the multiple data frames, to obtain the multiple acoustic features.

Further preferably, in the method, before predicting a corresponding translation text after transcription of the speech data according to the multiple acoustic features and the pre-trained cross-language transcription model, the method further comprises:

collecting several items of training speech data represented in the first language and real translation texts transcribed from said several items of training speech data and represented in the second language;

training the cross-language transcription model by using said items of training speech data and corresponding real translation texts.

Further optionally, in the method, the training the cross-language transcription model by using said items of training speech data and corresponding real translation texts specifically comprises:

putting the current training speech data into the cross-language transcription model so that the cross-language transcription model predicts a predicted translation text corresponding to the training speech data;

judging whether the predicted translation text of the training speech data is consistent with the real translation text;

in the case of inconsistency, modifying a model parameter of the cross-language transcription model to enable the predicted translation text of the training speech data as predicted by the cross-language transcription model to tend to be consistent with the corresponding real translation text; continuing to select next item of training speech data to train;

using the items of training speech data to repeatedly train the cross-language transcription model in a manner of performing the above steps, until the predicted translation text of the training speech data as predicted by the cross-language transcription model is consistent with the corresponding real translation text, determining the model parameter of the cross-language transcription model, and thereby determining the cross-language transcription model.

The present disclosure provides an artificial intelligence-based cross-language speech transcription apparatus, the apparatus comprising:

an obtaining module configured to pre-process to-be-transcribed speech data to obtain multiple acoustic features, the to-be-transcribed speech data being represented in a first language;

a predicting module configured to predict a corresponding translation text after transcription of the speech data according to the multiple acoustic features and a pre-trained cross-language transcription model; wherein the translation text is represented in a second language which is different from the first language.

Further optionally, in the apparatus, the obtaining module is specifically configured to:

sample the to-be-transcribed speech data at a preset sampling rate, to obtain multiple speech data sampling points;

perform quantization processing for the multiple speech data sampling points according to preset quantization bits, to obtain a Pulse Code Modulation file;

extract the multiple acoustic features from the Pulse Code Modulation file.

Further preferably, in the apparatus, the obtaining module is specifically configured to: select data frame of a present frame length from a beginning of the Pulse Code Modulation file; adjust a preset frame shift in turn from front to back and then select data frames of the preset frame length to obtain multiple data frames;

extract an acoustic feature of each data frame from the multiple data frames, to obtain the multiple acoustic features.

Further preferably, the apparatus further comprises:

a collecting module configured to collect several items of training speech data represented in the first language and real translation texts transcribed from said several items of training speech data and represented in the second language;

a training module configured to train the cross-language transcription model by using said items of training speech data and corresponding real translation texts.

Further optionally, in the apparatus, the training module is specifically configured to:

put the current training speech data into the cross-language transcription model so that the cross-language transcription model predicts a predicted translation text corresponding to the training speech data;

judge whether the predicted translation text of the training speech data is consistent with the real translation text;

in the case of inconsistency, modify a model parameter of the cross-language transcription model to enable the predicted translation text of the training speech data as predicted by the cross-language transcription model to tend to be consistent with the corresponding real translation text; continue to select next item of training speech data to train;

use the items of training speech data to repeatedly train the cross-language transcription model in a manner of performing the above steps, until the predicted translation text of the training speech data as predicted by the cross-language transcription model is consistent with the corresponding real translation text, determine the model parameter of the cross-language transcription model, and thereby determine the cross-language transcription model.

The present disclosure further provides a computer device, comprising:

one or more processors, a memory for storing one or more programs, the one or more programs, when executed by said one or more processors, enabling said one or more processors to implement the above-mentioned artificial intelligence-based cross-language speech transcription method.

The present disclosure further provides a computer readable medium on which a computer program is stored, the program, when executed by a processor, implementing the above-mentioned artificial intelligence-based cross-language speech transcription method.

According to the artificial intelligence-based cross-language speech transcription method and apparatus, the device and the readable medium, to-be-transcribed speech data is pre-processed to obtain multiple acoustic features, the to-be-transcribed speech data being represented in a first language; a corresponding translation text after transcription of the speech data is predicted according to the multiple acoustic features and a pre-trained cross-language transcription model; wherein the translation text is represented in a second language which is different from the first language. According to the technical solution of the present embodiment, it is unnecessary, upon cross-language speech transcription, to perform speech recognition first and then perform machine translation, but to directly perform cross-language transcription according to the pre-trained cross-language transcription model. The technical solution can overcome the problem of error accumulation in the two-step cross-language transcription manner in the prior art, and can effectively improve accuracy and efficiency of the cross-language speech transcription as compared with the prior art.

DETAILED DESCRIPTION OF PREFERRED EMBODIMENTS

The present disclosure will be described in detail in conjunction with figures and specific embodiments to make objectives, technical solutions and advantages of the present disclosure more apparent.

Figure 1:
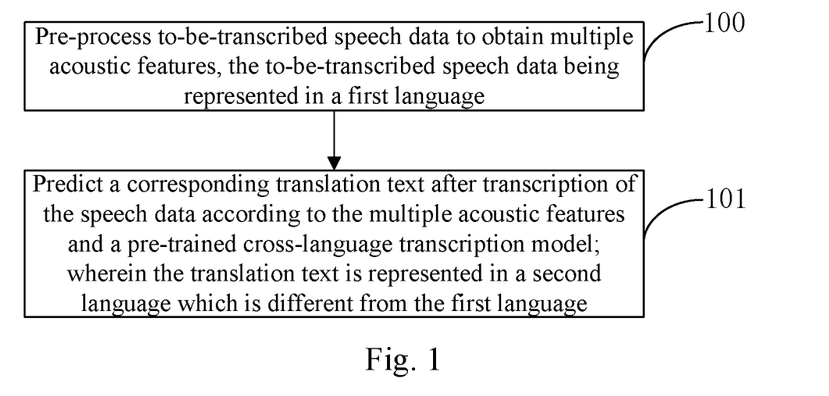
FIG. 1 is a flow chart of a first embodiment of an artificial intelligence-based cross-language speech transcription method according to the present disclosure.

FIG. 1 is a flow chart of a first embodiment of an artificial intelligence-based cross-language speech transcription method according to the present disclosure. As shown in FIG. 1, the artificial intelligence-based cross-language speech transcription method according to the present embodiment may specifically comprise the following steps:

100: pre-processing to-be-transcribed speech data to obtain multiple acoustic features, the to-be-transcribed speech data being represented in a first language;

101: predicting a corresponding translation text after transcription of the speech data according to the multiple acoustic features and a pre-trained cross-language transcription model; wherein the translation text is represented in a second language which is different from the first language.

A subject of executing the artificial intelligence-based cross-language speech transcription method according to the present embodiment is an artificial intelligence-based cross-language speech transcription apparatus. The artificial intelligence-based cross-language speech transcription apparatus may directly perform cross-language transcription for the to-be-transcribed speech data. The artificial intelligence-based cross-language speech transcription method according to the present embodiment is mainly used to transcribe the to-be-transcribed speech data represented in the first language into a translation text represented in the second language. The first language may be Chinese language, English language, Japanese language, Korean language, Tibetan language, Yi language or the like. Since the first language is the form of speech, the first language of the present embodiment may be a language of any country, or a language of an ethnic group having its own ethnic language. The second language is displayed in the form of a text, so the second language needs to be a language which has a text form. Standard languages within each country have their respective text forms, so the second language may also be a language of any country. In addition, some ethnic groups such as Tibetan, Yi, Dai and Zhuang have their own independent languages as well as characters corresponding to the respective languages. Hence, the second language may also be a language of an ethnic group having characters of its own language.

In the artificial intelligence-based cross-language speech transcription method according to the present embodiment, the pre-trained cross-language transcription model may be a network model obtained by performing deep learning training in advance. For example, the cross-language transcription model of the present embodiment may be an attention-based sequence-to-sequence deep learning model, for example a deep learning model in an encoder-decoder manner. What is input by the cross-language transcription model of the present embodiment is multiple acoustic features of the to-be-transcribed speech data, so in the present embodiment, first, the to-be-transcribed speech data in the first language is pre-processed to obtain multiple acoustic features of the to-be-transcribed speech data; then the multiple acoustic features of the to-be-transcribed speech data are input into the pre-trained cross-language transcription model. Since the cross-language transcription model is pre-trained in a manner of deep learning, the duly-trained cross-language transcription model may predict a corresponding translation text in the second language after transcription of the speech data according to the input multiple acoustic features of the to-be-transcribed speech data. In the present embodiment, although the translation text predicted by the cross-language transcription model is a prediction result, since the cross-language transcription model is obtained by training through deep learning, it can be believed at this time that the translation text predicted by the cross-language transcription model is consistent with a real translation text.

According to the artificial intelligence-based cross-language speech transcription method according to the present embodiment, to-be-transcribed speech data is pre-processed to obtain multiple acoustic features, the to-be-transcribed speech data being represented in a first language; a corresponding translation text after transcription of the speech data is predicted according to the multiple acoustic features and a pre-trained cross-language transcription model; wherein the translation text is represented in a second language which is different from the first language. According to the technical solution of the present embodiment, it is unnecessary, upon cross-language speech transcription, to perform speech recognition first and then perform machine translation, but to directly perform cross-language transcription according to the pre-trained cross-language transcription model. The technical solution can overcome the problem of error accumulation in the two-step cross-language transcription manner in the prior art, and can effectively improve accuracy and efficiency of the cross-language speech transcription as compared with the prior art.

Figure 2:
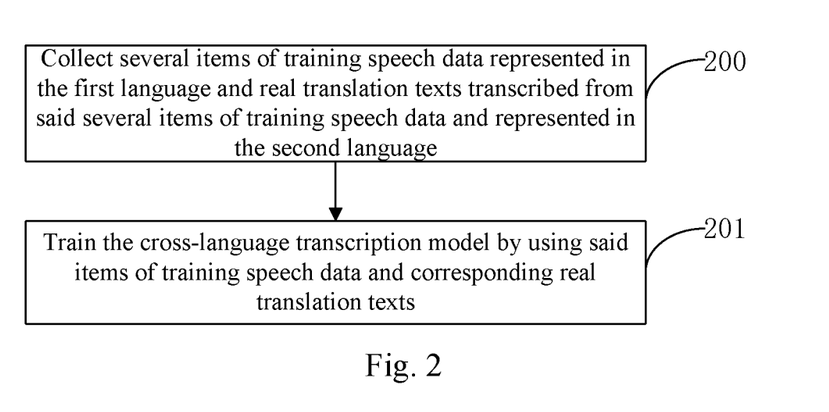
FIG. 2 is a flow chart of a second embodiment of an artificial intelligence-based cross-language speech transcription method according to the present disclosure.

FIG. 2 is a flow chart of a second embodiment of an artificial intelligence-based cross-language speech transcription method according to the present disclosure. The artificial intelligence-based cross-language speech transcription method of the present embodiment introduces the technical solution of the present disclosure in more detail on the basis of the technical solution of the embodiment shown in FIG. 1. As shown in FIG. 2, the artificial intelligence-based cross-language speech transcription method of the present embodiment, before step 101 of the embodiment shown in FIG. 1, may specifically further comprise the following steps:

200: collecting several items of training speech data represented in the first language and real translation texts transcribed from said several items of training speech data and represented in the second language;

In the present embodiment, when the cross-language transcription model is trained, it is necessary to collect several items of training speech data represented in the first language and real translation texts transcribed from said several items of training speech data and represented in the second language. For example, it is specifically feasible to collect, from a network or an already successfully-transcribed database, several items of training speech data represented in the first language and real translation texts transcribed from said several items of training speech data and represented in the second language, wherein each item of training speech data and a corresponding real translation text serve as one item of training data. In the present embodiment, to ensure the accuracy of the trained cross-language transcription model, the number of items of the collected training data may reach tens of thousands of items, for example, 200,000 items or 300,000 items or even more items. The more items of training data are collected, the more accurate the trained cross-language transcription model is, and a higher accuracy is achieved by the translation text which is transcribed from the to-be-transcribed speech data in the first language and is represented in the second language.

201: training the cross-language transcription model by using said items of training speech data and corresponding real translation texts.

In the present embodiment, after several items of training speech data represented in the first language and real translation texts transcribed from said several items of training speech data and represented in the second language are obtained, it is feasible to store the collected several items of training speech data represented in the first language and real translation texts transcribed from said several items of training speech data and represented in the second language in a database to generate a training database. Then upon training, each item of training speech data and a corresponding real translation text are used to train the cross-language transcription model.

For example, the step 201 "training the cross-language transcription model by using said items of training speech data and corresponding real translation texts" in the present embodiment may specifically comprise the following steps:

(a1) putting the current training speech data into the cross-language transcription model so that the cross-language transcription model predicts a predicted translation text corresponding to the training speech data;

(a2) judging whether the predicted translation text of the training speech data is consistent with the real translation text; if yes, performing step (a3), otherwise performing step (a4);

(a3) modifying a model parameter of the cross-language transcription model to enable the predicted translation text of the training speech data as predicted by the cross-language transcription model to tend to be consistent with the corresponding real translation text; performing step (a4);

(a4) continuing to select next item of training speech data as the current training data to prepare to train with the above steps (a1)-(a3);

using the items of training speech data to repeatedly train the cross-language transcription model in a manner of performing the above steps (a1)-(a4), until the predicted translation text of the training speech data as predicted by the cross-language transcription model is consistent with the corresponding real translation text, determining the model parameter of the cross-language transcription model, and thereby determining the cross-language transcription model.

For example, upon training, to facilitate use of each item of training speech data and a corresponding translation text to train the cross-language transcription model and avoid repeatedly using same item of training speech data and corresponding real translation text to repeatedly train the cross-language transcription model, it is feasible to rank the items of training speech data, select one item of training speech data as the current training speech data upon training each time, and upon completion of the training of the item of training speech data, continue to select next item of training speech data as the current training speech data to continue to train the cross-language transcription model.

It needs to be appreciated that before training, the model parameter of the cross-language transcription model of the present embodiment has an initial value. If the first item of training speech data is used to train the cross-language transcription model, the first item of training speech data is considered as the current training speech data and input into the cross-language transcription model, whereupon the cross-language transcription model outputs a predicted translation text corresponding to the training speech data according to the initial value of the current model parameter. Then, judgment is made as to whether the predicted translation text of the training speech data is consistent with the real translation text; if not, modify the model parameter of the cross-language transcription model to enable the predicted translation text of the training speech data as predicted by the cross-language transcription model to tend to be consistent with the corresponding real translation text; if yes, continue to select next item of training speech data as the current training data to continue training.

Upon training, respective items of training data in the training database are at least used to perform one round of training. If upon completion of the one round of training, it may be determined that the predicted translation text of the training speech data as predicted by the cross-language transcription model is consistent with the corresponding real translation text, the model parameter of the cross-language transcription model is determined and thereby the cross-language transcription model is determined.

If the predicted translation text of the training speech data as predicted by the cross-language transcription model is still inconsistent with the corresponding real translation text upon completion of the one round of training, it is feasible to, at this time, use respective training data in the training database to perform a further round, two rounds or more rounds of training until the predicted translation text of the training speech data as predicted by the cross-language transcription model is consistent with the corresponding real translation text, the model parameter of the cross-language transcription model is determined and thereby the cross-language transcription model is determined.

The cross-language transcription model obtained from training according to the present embodiment may translingually the to-be-transcribed speech data represented in the first language into a translation text represented in the second language. If a cross-language transcription model can support English-Chinese cross-language transcription and cannot achieve Italian-Chinese cross-language transcription, the cross-language transcription model of the present embodiment is in a one-to-one form and does not support one-to-more form or more-to-one form. In addition, it needs to be appreciated that in the present embodiment, if the translation text represented in the second language is in Chinese, Chinese pinyin of words is preferably selected to represent the translation text to facilitate correspondence to other languages. Furthermore, the representation manner with Chinese pinyin in the present embodiment may be representation with pinyin of each Chinese character as a minimum model building unit, for example, "zhong guo ren"; it is also feasible to use initial consonants and simple or compound vowels as a minimum model building unit, for example, segment "zhong guo ren" ino "zh ong g uo r en".

According to the artificial intelligence-based cross-language speech transcription method according to the present embodiment, the cross-language transcription model obtained from training by using the above technical solution may accurately perform cross-language transcription for the to-be-transcribed speech data. As compared with the prior art, it is unnecessary, upon cross-language speech transcription, to perform speech recognition first and then perform machine translation, but to directly perform cross-language transcription according to the pre-trained cross-language transcription model. The technical solution can overcome the problem of error accumulation in the two-step cross-language transcription manner in the prior art, and can effectively improve accuracy and efficiency of the cross-language speech transcription as compared with the prior art.

Figure 3:
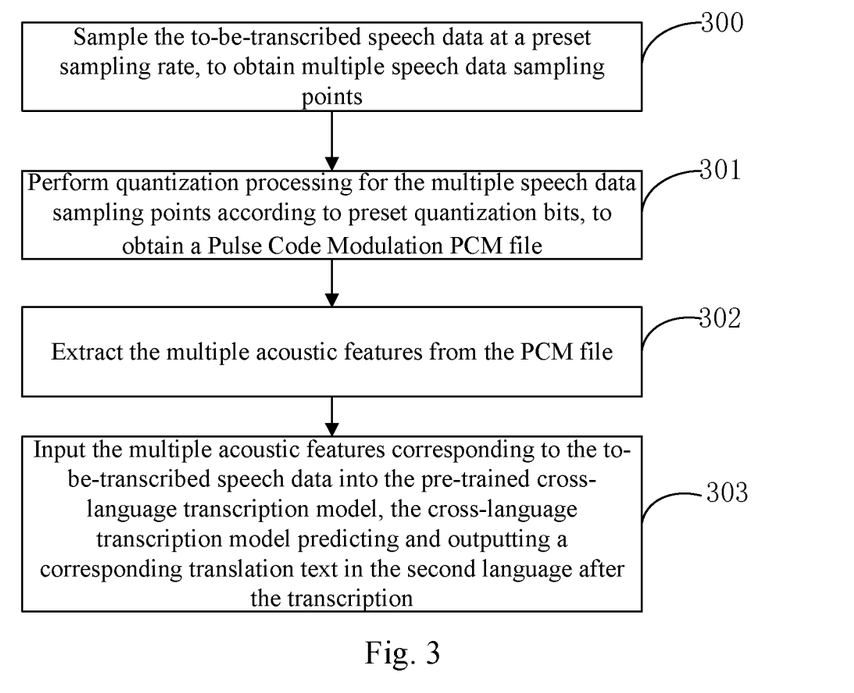
FIG. 3 is a flow chart of a third embodiment of an artificial intelligence-based cross-language speech transcription method according to the present disclosure.

FIG. 3 is a flow chart of a third embodiment of an artificial intelligence-based cross-language speech transcription method according to the present disclosure. The artificial intelligence-based cross-language speech transcription method of the present embodiment introduces the technical solution of the present disclosure in more detail on the basis of the technical solution of the embodiment shown in FIG. 1 or FIG. 2. As shown in FIG. 3, the artificial intelligence-based cross-language speech transcription method of the present embodiment may specifically comprise the following steps:

300: sampling the to-be-transcribed speech data represented in the first language at a preset sampling rate, to obtain multiple speech data sampling points;

For example, the preset sampling rate in the present embodiment may be 16 k, namely, a sampling point is selected per $1/16000$ seconds so that a speech one second long has 16000 sampling points. The predicted sampling rate in actual application may also be any sampling rate in a range of 8 k-20 k.

301: performing quantization processing for the multiple speech data sampling points according to preset quantization bits, to obtain a Pulse Code Modulation (PCM) file;

The preset quantization bits in the present embodiment may preferably be 16 bits. 16 bits may be selected in actual application. The more bits there are, the higher the quality is. The PCM file may be obtained after the quantization processing. Furthermore, the PCM file is a single-channel PCM file.

302: extracting multiple acoustic features from the PCM file;

Finally, multiple acoustic features are extracted from the PCM file. For example, it is feasible to extract an acoustic feature in Fbank40 format, wherein the acoustic feature in the Fbank40 format is represented with a 40-dimensional vector. In practical application, vectors in other formats and in other dimensions may also be used to represent the acoustic features.

For example, step 302 may specifically include the following steps:

(b1) selecting data frame of a present frame length from the beginning of the PCM file; adjusting a preset frame shift in turn from front to back and then selecting data frames of the preset frame length to obtain multiple data frames;

(b2) extracting an acoustic feature of each data frame from the multiple data frames, to obtain multiple acoustic features.

In the present embodiment, when the data frame is selected from the PCM file, since the PCM file is also represented with frames, it is feasible to select the data frame of a preset frame length from the beginning of the PCM file, for example, the preset frame length may be 25 ms, then adjust a preset frame shift in turn from front to back and then select data frames of the preset frame length. For example, as for the same PCM file, after a data frame of 25 ms is selected from the beginning, a 10 ms frame shift is performed, then a data frame of 25 ms is selected again, then a 10 ms frame shift is performed again, then a data frame of 25 ms is selected again until the PCM file is selected up. However, the length of the PCM file is not certainly a multiple of the preset frame length, whereupon the last data frame of less than 25 ms may be discarded or increased to the 25 ms frame length via zero fill. As such, the obtained each data frame has the same length so that the manner of extracting the acoustic feature from each data frame corresponding to the to-be-transcribed speech data is the same and the dimensionality of the obtained acoustic feature is the same. In practical application, the length of each segment of to-be-transcribed speech may not be the same, but the length of each data frame obtained from the to-be-transcribed speech is the same. Hence, when cross-language transcription is performed according to the cross-language transcription model of the present embodiment, the length of the to-be-transcribed speech data that is translingually transcribable may not be limited. Theoretically, it is feasible to perform cross-language transcription for the to-be-transcribed speech data of any time length that does not exceed a processable maximum time length. Certainly, the length of the obtained translation text after cross-language transcription varies.

The above steps 300-302 are a specific implementation mode of step 100 of the embodiment shown in FIG. 1. In practical application, it is also possible to implement in manners of extracting the acoustic feature from the speech data in the prior art. The manners are not detailed one by one here.

303: inputting the multiple acoustic features corresponding to the to-be-transcribed speech data into the pre-trained cross-language transcription model, the cross-language transcription model predicting and outputting a corresponding translation text in the second language after the transcription.

The pre-trained cross-language transcription model of the present embodiment is obtained in the manner of the embodiment shown in FIG. 2. Reference may be made to the depictions of the embodiment shown in FIG. 2 for details, and no detailed depictions will be presented here.

According to the artificial intelligence-based cross-language speech transcription method according to the present embodiment, with the above technical solution, it is unnecessary, upon cross-language speech transcription, to perform speech recognition first and then perform machine translation, but to directly perform cross-language transcription according to the pre-trained cross-language transcription model. The technical solution can overcome the problem of error accumulation in the two-step cross-language transcription manner in the prior art, and can effectively improve accuracy and efficiency of the cross-language speech transcription as compared with the prior art.

Figure 4:
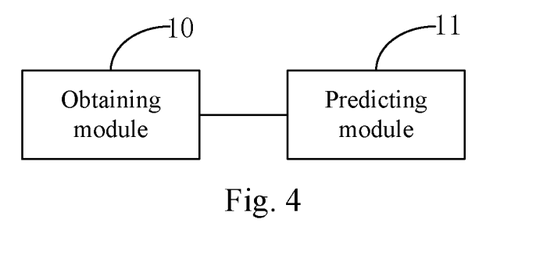
FIG. 4 is a structural diagram of a first embodiment of an artificial intelligence-based cross-language speech transcription apparatus according to the present disclosure.

FIG. 4 is a structural diagram of a first embodiment of an artificial intelligence-based cross-language speech transcription apparatus according to the present disclosure. As shown in FIG. 4, the artificial intelligence-based cross-language speech transcription apparatus according to the present embodiment may specifically comprise an obtaining module 10 and a predicting module 11.

The obtaining module 10 is configured to pre-process to-be-transcribed speech data to obtain multiple acoustic features, the to-be-transcribed speech data being represented in a first language;

the predicting module 11 is configured to predict a corresponding translation text after transcription of the speech data according to the multiple acoustic features obtained by the obtaining module 10 and a pre-trained cross-language transcription model; wherein the translation text is represented in a second language which is different from the first language.

Principles employed by the artificial intelligence-based cross-language speech transcription apparatus of the present embodiment to implement the artificial intelligence-based cross-language speech transcription with the above modules and the resultant technical effects are the same as those of the above-mentioned method embodiment. For particulars, please refer to the depictions of the aforesaid relevant method embodiment, and no detailed depictions will be presented here.

Figure 5:
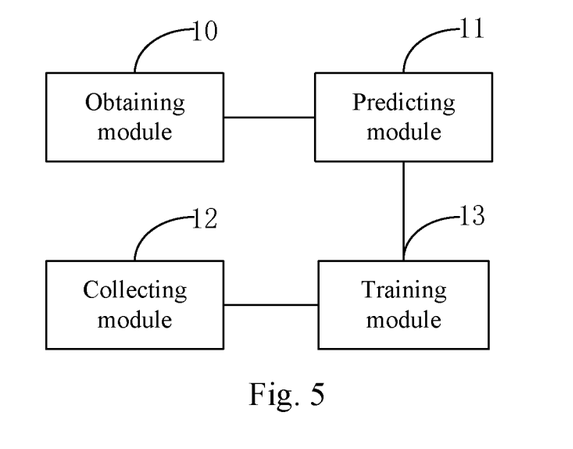
FIG. 5 is a structural diagram of a second embodiment of an artificial intelligence-based cross-language speech transcription apparatus according to the present disclosure.

FIG. 5 is a structural diagram of a second embodiment of an artificial intelligence-based cross-language speech transcription apparatus according to the present disclosure. As shown in FIG. 5, the artificial intelligence-based cross-language speech transcription apparatus, on the basis of the technical solution of the embodiment shown in FIG. 4, further introduces the technical solution of the present disclosure in more detail.

In the artificial intelligence-based cross-language speech transcription apparatus, the obtaining module 10 is specifically configured to:

sample the to-be-transcribed speech data at a preset sampling rate, to obtain multiple speech data sampling points;

perform quantization processing for the multiple speech data sampling points according to preset quantization bits, to obtain a Pulse Code Modulation file;

extract multiple acoustic features from the Pulse Code Modulation file.

Further preferably, in the artificial intelligence-based cross-language speech transcription apparatus of the present embodiment, the obtaining module 10 is specifically configured to:

select data frame of a present frame length from the beginning of the Pulse Code Modulation file; adjust a preset frame shift in turn from front to back and then select data frames of the preset frame length to obtain multiple data frames;

extract an acoustic feature of each data frame from the multiple data frames, to obtain multiple acoustic features.

Further preferably, as shown in FIG. 5, the artificial intelligence-based cross-language speech transcription apparatus of the present embodiment further comprises:

a collecting module 12 configured to collect several items of training speech data represented in the first language and real translation texts transcribed from said several items of training speech data and represented in the second language;

a training module 13 configured to train the cross-language transcription model by using said items of training speech data and corresponding real translation texts collected by the collecting module 12.

Correspondingly at this time, the predicting module 11 is configured to predict a corresponding translation text after transcription of the speech data according to the multiple acoustic features obtained by the obtaining module 10 and a cross-language transcription model pre-trained by the training module 13;

Further preferably, in the artificial intelligence-based cross-language speech transcription apparatus of the present embodiment, the training module 13 is specifically configured to:

put the current training speech data into the cross-language transcription model so that the cross-language transcription model predicts a predicted translation text corresponding to the training speech data;

judge whether the predicted translation text of the training speech data is consistent with the real translation text;

in the case of inconsistency, modify a model parameter of the cross-language transcription model to enable the predicted translation text of the training speech data as predicted by the cross-language transcription model to tend to be consistent with the corresponding real translation text; continue to select next item of training speech data to train;

use the items of training speech data to repeatedly train the cross-language transcription model in a manner of performing the above steps, until the predicted translation text of the training speech data as predicted by the cross-language transcription model is consistent with the corresponding real translation text, determine the model parameter of the cross-language transcription model, and thereby determine the cross-language transcription model.

Principles employed by the artificial intelligence-based cross-language speech transcription apparatus of the present embodiment to implement the artificial intelligence-based cross-language speech transcription with the above modules and the resultant technical effects are the same as those of the above-mentioned method embodiment. For particulars, please refer to the depictions of the aforesaid relevant method embodiment, and no detailed depictions will be presented here.

Figure 6:
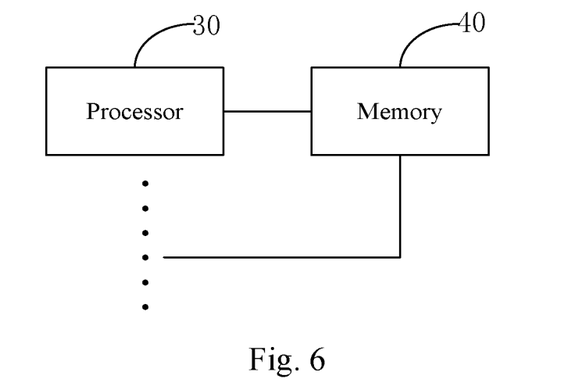
FIG. 6 is a structural diagram of an embodiment of a computer device according to the present disclosure.

FIG. 6 is a structural diagram of an embodiment of a computer device according to the present disclosure. As shown in FIG. 6, the computer device according to the present embodiment comprises: one or more processors 30, and a memory 40 for storing one or more programs, the one or more programs stored in the memory 40, when executed by said one or more processors 30, enabling said one or more processors 30 to implement the intelligence-based cross-language speech transcription method of the embodiments as shown in FIG. 1-FIG. 3. The embodiment shown in FIG. 6 exemplarily includes a plurality of processors 30.

Figure 7:
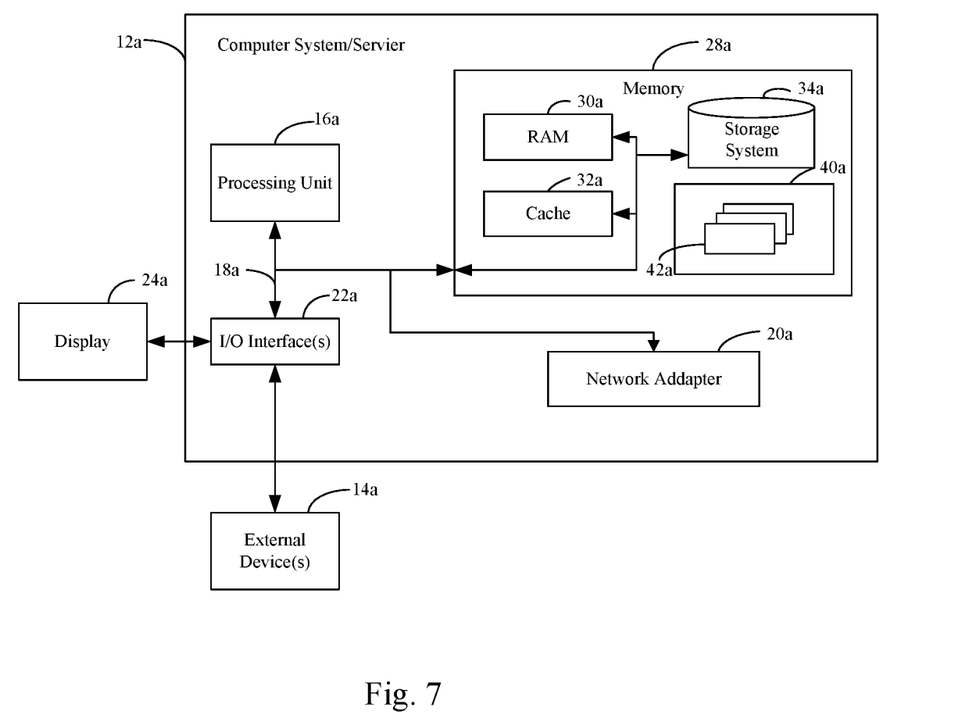
FIG. 7 is an example diagram of a computer device according to the present disclosure.

For example, FIG. 7 is an example diagram of a computer device according to the present disclosure. FIG. 7 shows a block diagram of an example computer device 12a adapted to implement an implementation mode of the present disclosure. The computer device 12a shown in FIG. 7 is only an example and should not bring about any limitation to the function and scope of use of the embodiments of the present disclosure.

As shown in FIG. 7, the computer device 12a is shown in the form of a general-purpose computing device. The components of computer device 12a may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and non-volatile media, removable and non-removable media.

The system memory 28a can include computer system readable media in the form of volatile memory, such as random access memory (RAM) 30a and/or cache memory 32a. Computer device 12a may further include other removable/non-removable, volatile/non-volatile computer system storage media. By way of example only, storage system 34a can be provided for reading from and writing to a non-removable, non-volatile magnetic media (not shown in FIG. 7 and typically called a "hard drive"). Although not shown in FIG. 7, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 3, FIG. 5, FIG. 9 and FIG. 10 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 3, FIG. 5, FIG. 9 and FIG. 10 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted in FIG. 7, network adapter 20a communicates with the other communication modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the intelligence-based cross-language speech transcription method shown in the above embodiments.

The present disclosure further provides a computer readable medium on which a computer program is stored, the program, when executed by a processor, implementing the intelligence-based cross-language speech transcription method shown in the above embodiments.

The computer readable medium of the present embodiment may include RAM 30a, and/or cache memory 32a and/or a storage system 34a in the system memory 28a in the embodiment shown in FIG. 7.

As science and technology develops, a propagation channel of the computer program is no longer limited to tangible medium, and it may also be directly downloaded from the network or obtained in other manners. Therefore, the computer readable medium in the present embodiment may include a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. An artificial intelligence-based cross-language speech transcription method, wherein the method comprises:
   pre-processing to-be-transcribed speech data to obtain multiple acoustic features in Fbank40 format, the to-be-transcribed speech data being represented in a first language; and
   predicting a corresponding translation text after transcription of the speech data according to the multiple acoustic features and a pre-trained cross-language transcription model; wherein the translation text is represented in a second language which is different from the first language,
   wherein before predicting a corresponding translation text after transcription of the speech data according to the multiple acoustic features and the pre-trained cross-language transcription model, the method further comprises:
      collecting, from a network, tens of thousands of items of training speech data represented in the first language and real translation texts transcribed from said tens of thousands of items of training speech data and represented in the second language; and
      training, in a manner of deep learning, the cross-language transcription model by using said items of training speech data and corresponding real translation texts.

2. The method according to claim 1, wherein the pre-processing to-be-transcribed speech data to obtain multiple acoustic features specifically comprises:
   sampling the to-be-transcribed speech data at a preset sampling rate, to obtain multiple speech data sampling points;
   performing quantization processing for the multiple speech data sampling points according to preset quantization bits, to obtain a Pulse Code Modulation file; and
   extracting the multiple acoustic features from the Pulse Code Modulation file.

3. The method according to claim 2, wherein the extracting the multiple acoustic features from the Pulse Code Modulation file specifically comprises:
   selecting data frame of a present frame length from a beginning of the Pulse Code Modulation file; adjusting a preset frame shift in turn from front to back and then selecting data frames of the preset frame length to obtain the multiple data frames; and
   extracting an acoustic feature of each data frame from the multiple data frames, to obtain the multiple acoustic features.

4. The method according to claim 1, wherein the training the cross-language transcription model by using said items of training speech data and corresponding real translation texts specifically comprises:
   putting the current training speech data into the cross-language transcription model so that the cross-language transcription model predicts a predicted translation text corresponding to the training speech data;
   judging whether the predicted translation text of the training speech data is consistent with the real translation text;
   in the case of inconsistency, modifying a model parameter of the cross-language transcription model to enable the predicted translation text of the training speech data as predicted by the cross-language transcription model to tend to be consistent with the corresponding real translation text; continuing to select next item of the training speech data to train; and
   using the items of training speech data to repeatedly train the cross-language transcription model in a manner of performing the above steps, until the predicted translation text of the training speech data as predicted by the cross-language transcription model is consistent with the corresponding real translation text, determining the model parameter of the cross-language transcription model, and thereby determining the cross-language transcription model.

5. A computer device, wherein the device comprises:
   one or more processors, and
   a memory for storing one or more programs,
   the one or more programs, when executed by said one or more processors, enabling said one or more processors to implement the following operation:
      pre-processing to-be-transcribed speech data to obtain multiple acoustic features in Fbank40 format, the to-be-transcribed speech data being represented in a first language; and
      predicting a corresponding translation text after transcription of the speech data according to the multiple acoustic features and a pre-trained cross-language transcription model; wherein the translation text is represented in a second language which is different from the first language,
   wherein before predicting a corresponding translation text after transcription of the speech data according to the multiple acoustic features and the pre-trained cross-language transcription model, the operation further comprises:
      collecting, from a network, tens of thousands of items of training speech data represented in the first language and real translation texts transcribed from said tens of thousands of items of training speech data and represented in the second language; and
      training, in a manner of deep learning, the cross-language transcription model by using said items of training speech data and corresponding real translation texts.

6. The computer device according to claim 5, wherein the pre-processing to-be-transcribed speech data to obtain multiple acoustic features specifically comprises:
   sampling the to-be-transcribed speech data at a preset sampling rate, to obtain multiple speech data sampling points;
   performing quantization processing for the multiple speech data sampling points according to preset quantization bits, to obtain a Pulse Code Modulation file; and
   extracting the multiple acoustic features from the Pulse Code Modulation file.

7. The computer device according to claim 6, wherein the extracting the multiple acoustic features from the Pulse Code Modulation file specifically comprises:
   selecting data frame of a present frame length from a beginning of the Pulse Code Modulation file; adjusting a preset frame shift in turn from front to back and then selecting data frames of the preset frame length to obtain the multiple data frames; and extracting an acoustic feature of each data frame from the multiple data frames, to obtain the multiple acoustic features.

8. The computer device according to claim 5, wherein the training the cross-language transcription model by using said items of training speech data and corresponding real translation texts specifically comprises:

putting the current training speech data into the cross-language transcription model so that the cross-language transcription model predicts a predicted translation text corresponding to the training speech data;

judging whether the predicted translation text of the training speech data is consistent with the real translation text;

in the case of inconsistency, modifying a model parameter of the cross-language transcription model to enable the predicted translation text of the training speech data as predicted by the cross-language transcription model to tend to be consistent with the corresponding real translation text; continuing to select next item of the training speech data to train; and using the items of training speech data to repeatedly train the cross-language transcription model in a manner of performing the above steps, until the predicted translation text of the training speech data as predicted by the cross-language transcription model is consistent with the corresponding real translation text, determining the model parameter of the cross-language transcription model, and thereby determining the cross-language transcription model.

9. A non-transitory computer readable medium on which a computer program is stored, wherein the program, when executed by a processor, implements the following operation:

pre-processing to-be-transcribed speech data to obtain multiple acoustic features in Fbank40 format, the to-be-transcribed speech data being represented in a first language; and predicting a corresponding translation text after transcription of the speech data according to the multiple acoustic features and a pre-trained cross-language transcription model; wherein the translation text is represented in a second language which is different from the first language, wherein before predicting a corresponding translation text after transcription of the speech data according to the multiple acoustic features and the pre-trained cross-language transcription model, the operation further comprises:

collecting, from a network, tens of thousands of items of training speech data represented in the first language and real translation texts transcribed from said tens of thousands of items of training speech data and represented in the second language; and training, in a manner of deep learning, the cross-language transcription model by using said items of training speech data and corresponding real translation texts.

10. The non-transitory computer readable medium according to claim 9, wherein the pre-processing to-be-transcribed speech data to obtain multiple acoustic features specifically comprises:

sampling the to-be-transcribed speech data at a preset sampling rate, to obtain multiple speech data sampling points;

performing quantization processing for the multiple speech data sampling points according to preset quantization bits, to obtain a Pulse Code Modulation file; and extracting the multiple acoustic features from the Pulse Code Modulation file.

11. The non-transitory computer readable medium according to claim 10, wherein the extracting the multiple acoustic features from the Pulse Code Modulation file specifically comprises:

selecting data frame of a present frame length from a beginning of the Pulse Code Modulation file; adjusting a preset frame shift in turn from front to back and then selecting data frames of the preset frame length to obtain the multiple data frames; and extracting an acoustic feature of each data frame from the multiple data frames, to obtain the multiple acoustic features.

12. The non-transitory computer readable medium according to claim 9, wherein the training the cross-language transcription model by using said items of training speech data and corresponding real translation texts specifically comprises:

putting the current training speech data into the cross-language transcription model so that the cross-language transcription model predicts a predicted translation text corresponding to the training speech data;

judging whether the predicted translation text of the training speech data is consistent with the real translation text;

in the case of inconsistency, modifying a model parameter of the cross-language transcription model to enable the predicted translation text of the training speech data as predicted by the cross-language transcription model to tend to be consistent with the corresponding real translation text; continuing to select next item of the training speech data to train; and using the items of training speech data to repeatedly train the cross-language transcription model in a manner of performing the above steps, until the predicted translation text of the training speech data as predicted by the cross-language transcription model is consistent with the corresponding real translation text, determining the model parameter of the cross-language transcription model, and thereby determining the cross-language transcription model.

* * * * *